(12) United States Patent
Kawai et al.

(10) Patent No.: US 11,407,203 B2
(45) Date of Patent: Aug. 9, 2022

(54) RESIN-COATED METAL SHEET FOR CONTAINER

(71) Applicant: JFE Steel Corporation, Tokyo (JP)

(72) Inventors: Yuya Kawai, Tokyo (JP); Junichi Kitagawa, Tokyo (JP); Yasuhide Oshima, Tokyo (JP); Katsumi Kojima, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 45 days.

(21) Appl. No.: 16/771,325

(22) PCT Filed: Oct. 12, 2018

(86) PCT No.: PCT/JP2018/038050
§ 371 (c)(1),
(2) Date: Jun. 10, 2020

(87) PCT Pub. No.: WO2019/116706
PCT Pub. Date: Jun. 20, 2019

(65) Prior Publication Data
US 2020/0338863 A1    Oct. 29, 2020

(30) Foreign Application Priority Data

Dec. 15, 2017  (JP) .............................. JP2017-240126

(51) Int. Cl.
*B32B 15/09* (2006.01)
(52) U.S. Cl.
CPC .......... *B32B 15/09* (2013.01); *B32B 2250/03* (2013.01); *B32B 2250/05* (2013.01);
(Continued)

(58) Field of Classification Search
CPC ..... B32B 15/08; B32B 15/09; B32B 2255/06; B32B 2255/10; B32B 2255/26;
(Continued)

(56) References Cited

U.S. PATENT DOCUMENTS

| 4,567,087 A | 1/1986 | O'Dell et al. |
| 4,800,033 A | 1/1989 | Stetter et al. |

(Continued)

FOREIGN PATENT DOCUMENTS

| CN | 1032765 A | 5/1989 |
| CN | 102218881 A | 10/2011 |

(Continued)

OTHER PUBLICATIONS

Extended European Search Report for European Application No. 18 887 678.3, dated Jul. 13, 2021, 7 pages.

(Continued)

*Primary Examiner* — Lee E Sanderson
(74) *Attorney, Agent, or Firm* — RatnerPrestia

(57) ABSTRACT

A resin-coated metal sheet for a container includes: a metal sheet; a first resin coating layer provided on an inner face of the metal sheet after forming; and a second resin coating layer provided on an outer face of the metal sheet after forming, the second resin coating layer containing: polyester resin having a melting point of 230° C. to 254° C. as a main component; and a lubricant component, a melting point of the lubricant component being 80° C. to 230° C., an average particle diameter of the lubricant component present on a surface of the second resin coating layer being 17.0 nm or less.

6 Claims, 1 Drawing Sheet

(52) U.S. Cl.
CPC ....... *B32B 2255/06* (2013.01); *B32B 2255/28* (2013.01); *B32B 2264/0257* (2013.01); *B32B 2264/1022* (2020.08); *B32B 2264/301* (2020.08); *B32B 2309/105* (2013.01); *B32B 2311/18* (2013.01); *B32B 2367/00* (2013.01); *B32B 2439/66* (2013.01)

(58) Field of Classification Search
CPC .......... B32B 2264/301; B32B 2439/66; B32B 2264/0257; B32B 2250/03; B32B 2250/05; B65D 1/165; B65D 7/04; B65D 25/14; B65D 25/34; C09D 167/02
USPC .............................. 428/35.8, 35.9, 458, 480
See application file for complete search history.

(56) References Cited

U.S. PATENT DOCUMENTS

| | | | | |
|---|---|---|---|---|
| 2006/0083908 | A1* | 4/2006 | Yoshida | B32B 27/08 428/216 |
| 2008/0261063 | A1* | 10/2008 | Yamanaka | B32B 1/02 428/483 |
| 2015/0232997 | A1 | 8/2015 | Riesop | |
| 2017/0008256 | A1 | 1/2017 | Yamanaka et al. | |
| 2018/0361715 | A1* | 12/2018 | Sato | B32B 27/08 |
| 2020/0172308 | A1 | 6/2020 | Kitagawa et al. | |

FOREIGN PATENT DOCUMENTS

| | | | |
|---|---|---|---|
| EP | 0130072 | A1 | 1/1985 |
| EP | 1449884 | A1 | 8/2004 |
| EP | 2752291 | A1 | 7/2014 |
| EP | 3616904 | A1 | 3/2020 |
| GB | 2211465 | A | 7/1989 |
| JP | 62503038 | A | 12/1987 |
| JP | 02303634 | A | 12/1990 |
| JP | 04091825 | A | 3/1992 |
| JP | 08169098 | A | 7/1996 |
| JP | 2002292734 | A | 10/2002 |
| JP | 2002292734 | A * | 10/2002 |
| JP | 2003246005 | A | 9/2003 |
| JP | 2004130536 | A | 4/2004 |
| JP | 2004148324 | A | 5/2004 |
| JP | 2006007746 | A | 1/2006 |
| JP | 2014144576 | A | 8/2014 |
| JP | 2014144577 | A | 8/2014 |
| JP | 2016505707 | A | 2/2016 |
| JP | 2017030210 | A | 2/2017 |
| TW | 201544310 | A | 12/2015 |
| WO | 2014105466 | A2 | 7/2014 |
| WO | 2018221385 | A1 | 12/2018 |

OTHER PUBLICATIONS

Australian Examination Report forr Australian Application No. 2018381974, dated Jun. 8, 2021, 5 pages.
Chinese Office Action with Search Report for Chinese Application No. 201880079670.3, dated Aug. 30, 2021, 8 pages.
Canadian Office Action for Canadian Application No. 3085410, dated Jun. 29, 2021, 4 pages.
International Search Report and Written Opinion for International Application No. PCT/JP2018/038050, dated Dec. 4, 2018, 7 pages.
Taiwanese Office Action for Taiwanese Application No. 107139995, dated Jun. 14, 2019, with Concise Statement of Relevance, 7 pages.
Korean Office Action for Korean Application No. 10-2020-7016896, dated Oct. 29, 2021, with Concise Statement of Relevance of Office Action, 6 pages.
Australian Examination Report for Australian Application No. 2018381974, dated Mar. 16, 2022, 3 pages.

* cited by examiner (a)
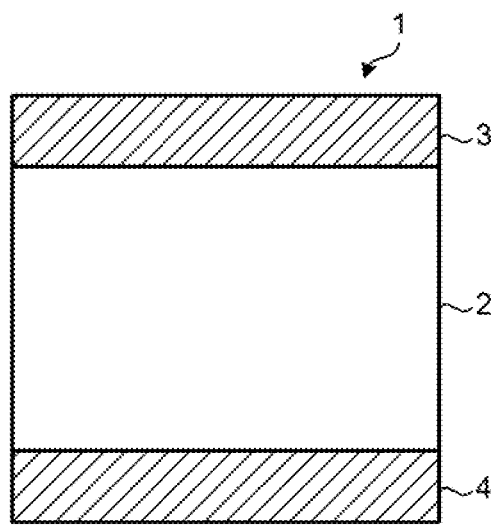
(b)
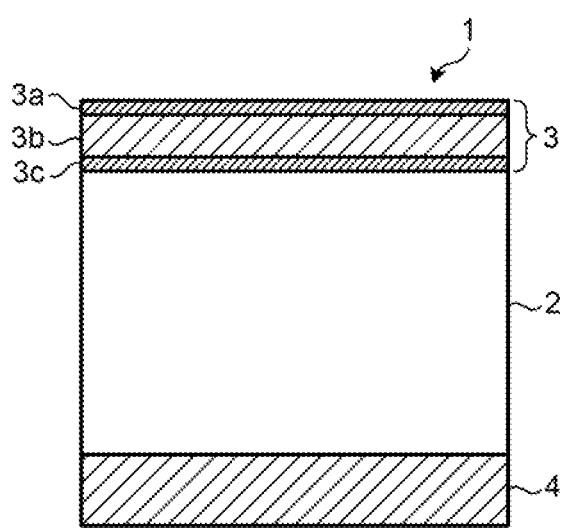

RESIN-COATED METAL SHEET FOR CONTAINER

CROSS REFERENCE TO RELATED APPLICATIONS

This is the U.S. National Phase application of PCT/JP2018/038050, filed Oct. 12, 2018, which claims priority to Japanese Patent Application No. 2017-240126, filed Dec. 15, 2017, the disclosures of these applications being incorporated herein by reference in their entireties for all purposes.

FIELD OF THE INVENTION

The present invention relates to a resin-coated metal sheet for a container including a resin coating layer on each face of a metal sheet.

BACKGROUND OF THE INVENTION

In general, metal containers are broadly divided into a two-piece can and a three-piece can. The two-piece can is a metal container including two parts, which are a can body integral with a can bottom, and a lid. On the other hand, the three-piece can is a metal container including three parts, which are a can barrel, an upper lid, and a bottom lid. Although the two-piece can has no welded part in the can body and thus has good appearance, a high degree of processing is required in general.

Conventionally, coating has been applied to metal sheets such as tin free steel (TFS) and aluminum used as materials for metal containers for the purpose of improvement in corrosion resistance and weatherability. However, techniques for application of the coating have problems in that a long processing time is required for complicated coating and baking processes and besides a large amount of solvents are discharged. Given these circumstances, to solve these problems, a resin-coated metal sheet for a container having a thermoplastic film on the surface of the metal sheet has been developed and is being currently used industrially widely, notably for materials for a beverage can.

In recent years, in view of a reduction in materials costs and resource savings, material sheets for use in metal cans have been reduced in thickness. When a can body with the same shape is manufactured using a thinned material, the degree of processing is high, and thus breaking or scraping may occur especially in a resin coating layer of a resin-coated metal sheet to be positioned on an outer face side of a metal container. Given these circumstances, to manufacture a can body of the two-piece can with a high degree of processing, material design preventing breaking or scraping of the resin coating layer is required.

Furthermore, various kinds of printing are performed on the resin coating layer on the outer face side of a metal can in order to improve design characteristics; when affinity between printing ink and the resin coating layer is low, the adhesiveness of the printing ink may fail to be ensured, and separation of the printing ink may impair good appearance. Given these circumstances, material design improving affinity with the printing ink is required for the resin coating layer on the outer face side of a metal can.

As techniques for manufacturing two-piece can bodies with the resin-coated metal sheet for a container as a material, techniques such as drawing and drawing and ironing (DI) have been developed (refer to Patent Literature 1, Literature 2, and Literature 3). Also developed are techniques adding a white pigment to the resin coating layer to be positioned on an outer face side of a metal can after forming so as to enable processing to improve the design characteristics of can bodies such as printing (refer to Patent Literature 4 and Literature 5). In addition, as a technique inhibiting breaking or scraping of the resin coating layer when the two-piece can with a high degree of processing is manufactured, a technique adding a lubricant component to the resin coating layer is also developed (refer to Patent Literature 6).

PATENT LITERATURE

Patent Literature 1: Japanese Patent Application Laid-open No. H02-303634
Patent Literature 2: Japanese Patent Application Laid-open No. H04-91825
Patent Literature 3: Japanese Patent Application Laid-open No. 2004-148324
Patent Literature 4: Japanese Patent Application Laid-open No. H08-169098
Patent Literature 5: Japanese Patent Application Laid-open No. 2004-130536
Patent Literature 6: Japanese Patent Application Laid-open No. 2017-30210

SUMMARY OF THE INVENTION

As described above, to inhibit breaking or scraping of the resin coating layer when the two-piece can with a high degree of processing is manufactured, the slidability of the surface of the resin coating layer is required to be ensured to improve formability by any method such as one adding the lubricant component to the resin coating layer. However, addition of the lubricant component may hinder adhesion between the resin coating layer and the printing ink and cause good appearance to be impaired. Given these characteristics, the conventional techniques do not achieve both required formability and ink adhesiveness, and such a resin-coated metal sheet for a container has yet to be obtained that can achieve both inhibition of breaking or scraping of the resin coating layer along with processing and good appearance after printing.

The technique described in Patent Literature 6 adds the lubricant component to the resin coating layer and controls a water contact angle of the resin coating layer to achieve both formability and ink adhesiveness. However, a hydrophobic surface with a water contact angle of as large as 80 degrees or more may fail to sufficiently obtain affinity between the resin coating layer and the printing ink, and separation of the printing ink may occur during such processes after printing as contents filling, lid seaming, and transportation.

Aspects of the present invention have been made in view of the above problem, and an object thereof is to provide a resin-coated metal sheet for a container that can inhibit breaking or scraping of the resin coating layer along with processing and separation of the printing ink after printing.

The inventors of the present invention have conducted earnest studies in order to solve the above problems. Consequently, the inventors of the present invention have obtained knowledge below. Specifically, when forming with a high degree of processing is performed, to inhibit breaking or scraping of the resin coating layer, a lubricant component is required to be added to the resin coating layer to reduce the friction of the surface of the resin coating layer. However, addition of the lubricant component may hinder adhesion between the resin coating layer and the printing ink and cause outward good appearance to be impaired, and thus it is very important to control the type and the amount of the lubricant component to be added.

The inventors of the present invention have found out that a distribution state of the lubricant component on the surface of the resin coating layer is an indicator indicating affinity between the resin coating layer and the lubricant component and have found out that the distribution state is made a specific value or less, whereby hindrance of adhesion between the resin coating layer and the printing ink can be inhibited. Printing in a can forming process is normally performed after heat treatment is performed after can forming in many cases, and an organic lubricant component is concentrated on the surface of the resin coating layer during the heat treatment to hinder adhesion between the resin coating layer and the printing ink. Given these circumstances, it is important to increase affinity between the resin coating layer and the lubricant component to make the lubricant component hard to be concentrated on the surface of the resin coating layer during the heat treatment. Aspects of the present invention have been made based on the above knowledge, and the gist thereof is as follows.

To solve the problem and achieve the object, a resin-coated metal sheet for a container according to aspects of the present invention includes resin coating layers on two faces of a metal sheet, wherein a resin coating layer to be positioned on an outer face side of the container after forming contains: polyester resin having a melting point of 230° C. to 254° C. as a main component; and a lubricant component, where a melting point of the lubricant component is 80° C. to 230° C., and an average particle diameter of the lubricant component present on the surface of the resin coating layer is 17.0 nm or less.

Moreover, in the resin-coated metal sheet for the container according to aspects of the present invention, the lubricant component contained in the resin coating layer to be positioned on the outer face side of the container after forming is 0.010% by mass to 1.0% by mass. Further, the lubricant component contained in the resin coating layer to be positioned on the outer face side of the container after forming is an acid-modified polyolefin or an oxidized polyolefin with: a weight average molecular weight of 2,500 or more and less than 80,000; and an acid value of 1.0 mg KOH/g to 100 mg KOH/g.

Moreover, in the resin-coated metal sheet for the container according to aspects of the present invention, the resin coating layer to be positioned on the outer face side of the container after forming contains 30% by mass or less of titanium oxide.

Moreover, in the resin-coated metal sheet for the container according to aspects of the present invention, the resin coating layer to be positioned on the outer face side of the container after forming has at least a three-layer structure including an outermost layer, an intermediate layer, and a lowermost layer, thicknesses of the outermost layer and the lowermost layer are 1.0 μm to 5.0 μm, a thickness of the intermediate layer is 6.0 μm to 30 μm, each of the outermost layer and the lowermost layer contains 0.0% by mass to 2.0% by mass of titanium oxide, and the intermediate layer contains 10% by mass to 30% by mass of titanium oxide.

Aspects of the present invention can provide a resin-coated metal sheet for a container that can inhibit breaking or scraping of the resin coating layer along with processing and separation of the printing ink after printing.

BRIEF DESCRIPTION OF THE DRAWINGS

FIG. 1 includes sectional views of configurations of a resin-coated metal sheet for a container as an embodiment of the present invention.

DETAILED DESCRIPTION OF EMBODIMENTS OF THE INVENTION

The following describes a resin-coated metal sheet for a container as an embodiment of the present invention. In the following, "%" indicates "% by mass" unless otherwise specified.

FIG. 1(a) and FIG. 1(b) are sectional views of configurations of the resin-coated metal sheet for a container as the embodiment of the present invention. As illustrated in FIG. 1(a), this resin-coated metal sheet 1 for a container as the embodiment of the present invention includes a metal sheet 2, a resin coating layer 3 formed on a front face side of the metal sheet 2, and a resin coating layer 4 formed on a back face side of the metal sheet 2. The resin coating layer 3 and the resin coating layer 4 are positioned on an outer face side and an inner face side, respectively, of a metal container after forming.

The metal sheet 2 is formed of a steel sheet such as tin or tin free steel. As tin, one with a plating amount within a range of 0.5 g/m$^2$ or more and 15 g/m$^2$ or less is preferably used. Tin free steel preferably has a metal chromium layer with an adhesion amount within a range of 50 mg/m$^2$ or more and 200 g/m$^2$ or less and a chromium oxide layer with an adhesion amount in terms of the metal chromium layer within a range of 3 mg/m$^2$ or more and 30 g/m$^2$ or less on a surface thereof. The type of the steel sheet is not limited to a particular one so long as it can be formed into a desired shape; ones with the following components and methods of production are preferred.

(1) One subjected to recrystallization annealing by continuous annealing using a low carbon steel having a C (carbon) amount within a range of about 0.010% or more and 0.10% or less.

(2) One subjected to recrystallization annealing and overaging treatment by continuous annealing using a low carbon steel having a C amount within a range of about 0.010% or more and 0.10% or less.

(3) One subjected to recrystallization annealing by box annealing using a low carbon steel having a C amount within a range of about 0.010% or more and 0.10% or less.

(4) One subjected to recrystallization annealing by continuous annealing or box annealing and then secondary cold rolling (double reduced (DR) rolling) using a low carbon steel having a C amount within a range of about 0.010% or more and 0.10% or less.

(5) One subjected to recrystallization annealing by continuous annealing using an interstitial free (IF) steel, in which elements, such as Nb and Ti, fixing C dissolved as a solid-solution are added to an extremely low carbon steel having a C amount within a range of about 0.003% or less.

The mechanical characteristics of the steel sheet are not limited to particular ones so long as the steel sheet can be formed into a desired shape; not to impair formability and to ensure sufficient can body strength. One having a yield point (YP) within a range of about 220 MPa or more and 580 MPa or less is preferably used. As to the Lankford value (the r value) as an indicator of plastic anisotropy, one with a value of 0.8 or more is preferred. Furthermore, as to the in-plane anisotropy Ar of the r value, one with an absolute value thereof of 0.7 or less is preferred.

Steel components for achieving the above characteristics are not limited to particular ones; components such as Si, Mn, P, S, Al, and N may be contained, for example. It is preferred that a Si content is within a range of 0.001% or more and 0.1% or less, a Mn content is within a range of 0.01% or more and 0.6% or less, a P content is within a range of 0.002% or more and 0.05% or less, a S content is within a range of 0.002% or more and 0.05% or less, an Al content is within a range of 0.005% or more and 0.100% or less, and a N content is within a range of 0.0005% or more and 0.020% or less. Other components such as Ti, Nb, B, Cu, Ni, Cr, Mo, and V may be contained; in view of ensuring corrosion resistance and the like, the content of these components is preferably 0.02% or less in terms of a total amount.

The resin coating layer 3 has a polyester resin having a melting point of 230° C. or more and 254° C. or less as a main component. The melting point of the polyester resin is preferably 234° C. or more and 252° C. or less; more preferably, the melting point of the polyester resin is within a range of 238° C. or more and 250° C. or less. When the melting point of the polyester resin is less than 230° C., the resin may soften through heat applied during continuous forming, and breaking or scraping occurs in the resin coating layer 3. On the other hand, when the melting point of the polyester resin is greater than 254° C., the polyester resin increases in crystallinity to degrade the formability of the resin.

As raw materials of the polyester resin, various dicarboxylic acid components and glycol components may be used. To the extent that heat resistance and formability are not impaired, a plurality of dicarboxylic acid components and glycol components may be copolymerized. Examples of the dicarboxylic acid components include aromatic dicarboxylic acids such as terephthalic acid, isophthalic acid, naphthalene dicarboxylic acid, diphenyl dicarboxylic acid, diphenyl sulfone dicarboxylic acid, diphenoxyethane dicarboxylic acid, sodium 5-sulfoisophthalate, and phthalic acid; aliphatic dicarboxylic acids such as oxalic acid, succinic acid, adipic acid, sebacic acid, dimer acids, maleic acid, and fumaric acid; alicyclic dicarboxylic acids such as cyclohexane dicarboxylic acid; and oxycarboxylic acids such as p-oxybenzoic acid. Examples of the glycol components include aliphatic glycols such as ethylene glycol, propanediol, butanediol, pentanediol, hexanediol, and neopentyl glycol; alicyclic glycols such as cyclohexane dimethanol; aromatic glycols such as bisphenol A and bisphenol S; and diethylene glycol.

The resin material forming the resin coating layer 3 is not limited by a method for producing the same. In producing the polyester, additives such as fluorescence whitening agents, antioxidants, thermal stabilizers, ultraviolet absorbers, and antistatic agents may be added as needed. To improve whiteness, addition of fluorescence whitening agents is effective.

The resin coating layer 3 contains a lubricant component. When harsh processing such as manufacture of a two-piece can is performed, in view of ensuring the slidability of a surface, addition of the lubricant component to the resin coating layer 3 is required. An organic lubricant component to be contained is preferably 0.010% or more and 1.0% or less, more preferably 0.020% or more and 0.90% or less, and even more preferably 0.020% or more and 0.80% or less. When the added amount of the lubricant component is less than 0.010%, sufficient slidability may fail to be ensured during can forming, and scraping of the resin coating layer 3 may occur. When the added amount of the lubricant component is greater than 1.0%, the proportion of the lubricant component in the resin coating layer 3 is large, whereby the resin coating layer 3 may soften, and scraping may occur during can forming.

The lubricant component present on the surface of the resin coating layer 3 has an average particle diameter of 17.0 nm or less. The average particle diameter is preferably 15.0 nm or less and even more preferably 13.0 nm or less. The average particle diameter of the lubricant component dispersed on the surface of the resin coating layer 3 is an indicator of affinity between the resin coating layer 3 and the lubricant component; higher affinity between the resin coating layer 3 and the lubricant component gives a smaller average particle diameter of the dispersed lubricant component. When the average particle diameter of the lubricant component dispersed on the surface of the resin coating layer 3 is greater than 17.0 nm, affinity between the resin coating layer 3 and the lubricant component is low; the lubricant component is concentrated on the surface of the resin coating layer 3 in a heating process performed after can forming to markedly hinder the adhesiveness of printing ink, and separation of the printing ink may occur during such processes after can forming as contents filling, lid seaming, and transportation.

The melting point of the lubricant component contained in the resin coating layer 3 is 80° C. or more and 230° C. or less. When the lubricant component having a melting point of less than 80° C. is used, the lubricant component is likely to be concentrated on the surface of the resin coating layer 3, and concentration of the lubricant component on the surface of the resin coating layer 3 hinders the adhesion of the printing ink. On the other hand, when the melting point of the lubricant component is greater than 230° C., sufficient slidability cannot be obtained during processing, and scraping or breaking of the resin coating layer 3 occurs during can forming. The melting point of the lubricant component to be added is preferably 90° C. or more and 200° C. or less and more preferably 100° C. or more and 180° C. or less.

As the lubricant component to be added to the resin coating layer 3, in view of ensuring affinity with the polyester resin as the main component of the resin coating layer 3, an organic lubricant component having a polar group is preferably used. Examples of the organic lubricant component having a polar group include oxidized polyolefins such as an oxidized polyethylene and acid-modified polyolefins such as an ethylene-acrylic acid copolymer and an ethylene-maleic anhydride copolymer. The acid value or the like of the organic lubricant component changes affinity with the resin coating layer 3; a higher acid value tends to give higher affinity with the resin coating layer 3 and make dispersion size on the surface of the resin coating layer 3 smaller.

To obtain high affinity with the resin coating layer 3, the acid value of the lubricant component contained in the resin coating layer 3 may be controlled. The acid value of the lubricant component is preferably 1.0 mg KOH/g or more and 100 mg KOH/g or less, more preferably 1.0 mg KOH/g or more and 50 mg KOH/g or less, and even more preferably 2.0 mg KOH/g or more and 45 mg KOH/g or less. When the acid value of the lubricant component contained in the resin coating layer 3 is less than 1.0 mg KOH/g, affinity between the resin coating layer 3 and the printing ink decreases, and the lubricant component may be concentrated on the surface of the resin coating layer 3, whereby the adhesiveness of the printing ink may be hindered. On the other hand, when the acid value of the lubricant component is greater than 100 mg KOH/g, affinity between the resin coating layer 3 and the lubricant component increases to be compatible with each other, a friction coefficient reduction effect required during can forming may fail to be obtained, and scraping may occur during can forming.

The lubricant component contained in the resin coating layer 3 is preferably an acid-modified polyolefin or an oxidized polyolefin. These lubricant components are suitable for obtaining the above performance, are excellent in resin properties and in terms of costs, and are suitable for the lubricant component for the resin-coated metal sheet requiring low costs and a high degree of processing as an object according to aspects of the present invention. The weight average molecular weight of the lubricant component is preferably 2,500 or more and less than 80,000. When the weight average molecular weight of the lubricant component is less than 2,500, the mobility of the lubricant component within the resin coating layer 3 is large, the lubricant component may be concentrated on the surface of the resin coating layer 3, and the adhesiveness of the printing ink may be hindered. On the other hand, when the weight average molecular weight of the lubricant component is greater than 80,000, sufficient slidability may fail to be obtained during processing. The weight average molecular weight of the lubricant component is more preferably 3,000 or more and less than 75,000 and even more preferably 3,500 or more and less than 70,000.

The resin coating layer 3 may be required to be white in order to improve design characteristics after printing. In this case, the resin coating layer 3 may contain titanium oxide of 30% or less. The content of titanium oxide is preferably 10% or more and 25% or less and more preferably 12% or more and 20% or less. A lower content of titanium oxide may fail to ensure sufficient whiteness after processing. An excessively high content of titanium oxide may cause a problem with adhesiveness between the metal sheet 2 and the resin coating layer 3 or the formability of the resin coating layer 3 during forming with a high degree of processing.

Titanium oxide to be added to the resin coating layer 3 is not limited to a particular one; one with a purity of rutile type titanium oxide of 90% or more is preferably used. When the purity of rutile type titanium oxide is less than 90%, the dispersibility of titanium oxide is poor during mixing with the resin material, and thus the quality of the resin coating layer 3 is nonuniform, which may be problematic.

As illustrated in FIG. 1(*b*), the resin coating layer 3 may have at least a three-layer structure including an outermost layer 3*a*, an intermediate layer 3*b*, and a lowermost layer 3*c*. In this case, the thickness of the outermost layer 3*a* and the lowermost layer 3*c* is preferably 1.0 μm or more and 5.0 μm or less, more preferably 1.5 μm or more and 4.0 μm or less, and even more preferably 2.0 μm or more and 3.0 μm or less. The thickness of the intermediate layer 3*b* is preferably 6.0 μm or more and 30 μm or less, more preferably 8.0 μm or more and 25 μm or less, and even more preferably 10 μm or more and 20 μm or less. The outermost layer 3*a* and the lowermost layer 3*c* preferably each contain titanium oxide of 0.0% by mass or more and 2.0% by mass or less. The intermediate layer 3*b* preferably contains titanium oxide of 10% by mass or more and 30% by mass or less.

When the thickness of the outermost layer 3*a* and the lowermost layer 3*c* is smaller than 1.0 μm, a luster of the resin coating layer 3 may fail to be ensured sufficiently, or breaking or scraping of the resin coating layer 3 may occur, and thus the thickness of the outermost layer 3*a* and the lowermost layer 3*c* is preferably 1.0 μm or more. On the other hand, when the thickness of the outermost layer 3*a* and the lowermost layer 3*c* is larger than 5.0 μm, to ensure whiteness, the thickness of the intermediate layer 3*b* is required to be increased, or the amount of titanium oxide contained in the intermediate layer 3*b* is required to be increased, which is not preferred in view of economy and formability.

Examples

Using tin free steel (TFS, metal Cr layer: 120 mg/m$^2$, Cr oxide layer: 10 mg/m$^2$ in terms of metal Cr, tempering degree: T3CA) with a thickness of 0.22 mm as a metal sheet, each face of the metal sheet was coated with each of the resin coating layers of Examples 1 to 31 and Comparative Examples 1 to 16 listed in Tables 1 to 4 below by film laminating (film heat fusion). The coating conditions are as listed in Tables 1-4 below. The metal sheet was heated; a film-shaped resin coating layer produced by biaxial stretching was thermocompressed to the metal sheet with a laminate roll and was water-cooled when 1.5 seconds elapsed after thermocompression to produce a sample in which each face of the metal sheet was coated with the resin coating layer.

For the obtained resin-coated metal sheets for a container, the melting point of the resin coating layer and the dispersion size of the lubricant component on the surface of the resin coating layer were measured by methods described below.

(1) Melting Point of Resin Coating Layer

Using a differential scanning calorimetric apparatus, the temperature of the resin coating layer delaminated from the resin-coated metal sheet for a container was raised with a temperature rising rate of 10° C./minute from room temperature to 290° C., and a peak temperature of an endothermic peak within a range of 200° C. or more and 280° C. or less was determined to be the melting point of the resin coating layer. Delamination of the resin coating layer was performed by immersing the resin-coated metal sheet for a container into a mixed solution of concentrated hydrochloric acid (12 mol/L):distilled water=1:1 at room temperature to dissolve the metal sheet.

(2) Average Particle Diameter of Lubricant Component Dispersed on Surface of Resin Coating Layer Using a chemical force microscope (CFM), observation of the surface of the resin coating layer of the resin-coated metal sheet for a container was performed for five fields of view (field of view area: 1 μm×1 μm) at room temperature, and randomly for 20 observed particles of the lubricant component for each field of view, a particle diameter was calculated using Expression (1) below from measurement results of the length of a major axis and the length of a minor axis, and their average (an average of "five fields of view×20 spots=100 spots") was determined to be the average particle diameter of the lubricant component. When the lubricant component was not observed at 20 spots in any field of view, measurement was performed for all the particles within the field of view, and their average was used. For measurement, a probe with its tip subjected to hydrophobic treatment was used. The lubricant component dispersed in a size less than 10 nm, which is a measurement limit, is denoted by "<10" in Tables 1 to 4.

$$(\text{Particle diameter}) = \{(\text{length of major axis}) \times (\text{length of minor axis})\}^{(1/2)} \quad (1)$$

For the resin-coated metal sheets for a container of Examples 1 to 31 and Comparative Examples 1 to 16, formability and ink adhesiveness were evaluated by methods described below. Table 5 lists evaluation results of formability and ink adhesiveness. As listed in Table 5, although the resin-coated metal sheets for a container of Examples 1 to 31 were favorable both in formability and ink adhesiveness, those of Comparative Examples 1 to 16 were insufficient in any evaluation result of formability and ink adhesiveness.

(1) Formability

Paraffin wax was applied to each of the resin-coated metal sheets for a container of Examples 1 to 31 and Comparative Examples 1 to 16, was then punched off into a disc sheet with a diameter of 123 mm, and was drawn into a cup with an inner diameter of 71 mm and a height of 36 mm with a cupping press machine. Subsequently, the obtained cup was put into a DI forming apparatus, and redrawing with a punch speed of 200 mm/second and a stroke of 560 mm and processing with a total reduction rate of 51% (reduction rates of the respective steps: 23%, 25%, and 25%) by three-step ironing were performed to form a can with an inner diameter of 52 mm and a can height of 90 mm. For the formed can, the surface of the resin coating layer was visually observed, and formability was evaluated in accordance with criteria below.

Evaluation "A": No scraping is observed.

Evaluation "B": Scraping slightly occurs at a height of 2 mm or less from a can flange part; practically no problem.

Evaluation "C": Scraping occurs at a height of greater than 2 mm and 20 mm or less from the can flange part; practically problematic.

Evaluation "D": Scraping reaching a height of greater than 20 mm from the can flange part or breakage occurs; practically problematic.

(2) Ink Adhesiveness

The resin-coated metal sheets for a container of Examples 1 to 31 and Comparative Examples 1 to 16 were subjected to heat treatment, by taking 2 minutes, with a hot-air drying furnace, such that the temperature of the resin-coated metal sheets for the container of Examples 1 to 31 and Comparative Examples 1 to 16 rises to the melting point of the resin coating layer plus 8° C. and were then cooled to room temperature. Subsequently, polyester-based printing ink (red) was printed on the resin coating layer to be positioned on an outer face side of a container of each sample, was subjected to heat treatment with a hot-air drying furnace at 180° C. for 5 minutes, and was cooled to room temperature. Using a scratch type coating hardness tester, the obtained face on which the ink had been printed of the sample was scanned from a print end under a load of 500 g at a speed of 10 mm/minute to measure a maximum pencil hardness in which ink separation did not occur, and ink adhesiveness was evaluated in accordance with criteria below. When separation of the printing ink occurs during the processes such as transportation of can bodies, separation from the print end is frequently perceived as a problem, and thus evaluation was performed with scanning started from the print end.

Evaluation "A": pencil hardness of 3H or more. Evaluation "B": pencil harness of 2H; practically no problem. Evaluation "C": pencil harness of H; practically problematic. Evaluation "D": pencil harness of F or less; practically problematic.

TABLE 1

| | Resin composition [mol %] | TiO$_2$ amount [wt %] | Lubricant component | Acid value of lubricant component [mg KOH/g] | Weight average molecular weight of lubricant component | Melting point of lubricant component [° C.] | Added amount of lubricant component [wt %] | Dispersion diameter of lubricant component [nm] | Thickness [μm] | Resin melting point [° C.] | Laminate conditions Metal sheet temperature [° C.] | Laminate roll temperature [° C.] |
|---|---|---|---|---|---|---|---|---|---|---|---|---|
| Example 1 | Ethylene terephthalate 96 Ethylene isophthalate 4 | 0 | Acid-modified polyethylene | 1.0 | 29000 | 125 | 0.10 | 16.8 | 20 | 247 | 256 | 85 |
| Example 2 | Ethylene terephthalate 96 Ethylene isophthalate 4 | 16 | Acid-modified polyethylene | 2.0 | 24000 | 120 | 0.10 | 15.7 | 20 | 247 | 256 | 85 |
| Example 3 | Ethylene terephthalate 96 Ethylene isophthalate 4 | 16 | Acid-modified polyethylene | 10 | 8400 | 125 | 0.20 | <10 | 20 | 247 | 256 | 85 |
| Example 4 | Ethylene terephthalate 96 Ethylene isophthalate 4 | 30 | Acid-modified polyethylene | 25 | 4600 | 110 | 0.20 | <10 | 20 | 247 | 256 | 85 |
| Example 5 | Ethylene terephthalate 96 Ethylene isophthalate 4 | 0 | Acid-modified polyethylene | 30 | 23000 | 123 | 0.20 | <10 | 20 | 247 | 256 | 85 |
| Example 6 | Ethylene terephthalate 96 Ethylene isophthalate 4 | 16 | Acid-modified polyethylene | 30 | 23000 | 123 | 0.20 | <10 | 20 | 247 | 256 | 85 |
| Example 7 | Ethylene terephthalate 96 Ethylene isophthalate 4 | 16 | Acid-modified polyethylene | 30 | 23000 | 123 | 1.0 | 11.8 | 20 | 247 | 256 | 85 |
| Example 8 | Ethylene terephthalate 96 Ethylene isophthalate 4 | 16 | Acid-modified polypropylene | 12 | 69000 | 124 | 0.20 | <10 | 20 | 247 | 256 | 85 |
| Example 9 | Ethylene terephthalate 96 Ethylene isophthalate 4 | 16 | Acid-modified polypropylene | 18 | 52000 | 123 | 0.20 | <10 | 20 | 247 | 256 | 85 |

TABLE 1-continued

| | Resin composition [mol %] | TiO₂ amount [wt %] | Lubricant component | Acid value of lubricant component [mg KOH/g] | Weight average molecular weight of lubricant component | Melting point of lubricant component [° C.] | Added amount of lubricant component [wt %] | Dispersion diameter of lubricant component [nm] | Thickness [μm] | Resin melting point [° C.] | Metal sheet temperature [° C.] | Laminate roll temperature [° C.] |
|---|---|---|---|---|---|---|---|---|---|---|---|---|
| Example 10 | Ethylene terephthalate 96 Ethylene isophthalate 4 | 16 | Acid-modified polypropylene | 18 | 52000 | 123 | 0.40 | <10 | 20 | 247 | 256 | 85 |
| Example 11 | Ethylene terephthalate 96 Ethylene isophthalate 4 | 16 | Acid-modified polypropylene | 45 | 18000 | 134 | 0.20 | <10 | 20 | 247 | 256 | 85 |
| Example 12 | Ethylene terephthalate 96 Ethylene isophthalate 4 | 16 | Acid-modified polypropylene | 50 | 30000 | 135 | 0.20 | <10 | 20 | 247 | 256 | 85 |
| Example 13 | Ethylene terephthalate 96 Ethylene isophthalate 4 | 16 | Oxidized polyethylene | 15 | 4200 | 105 | 0.20 | <10 | 20 | 247 | 256 | 85 |
| Example 14 | Ethylene terephthalate 96 Ethylene isophthalate 4 | 16 | Oxidized polyethylene | 20 | 3000 | 110 | 0.20 | 13.5 | 20 | 247 | 256 | 85 |
| Example 15 | Ethylene terephthalate 96 Ethylene isophthalate 4 | 20 | Oxidized polyethylene | 35 | 8400 | 122 | 0.20 | <10 | 20 | 247 | 256 | 85 |
| Example 16 | Ethylene terephthalate 96 Ethylene isophthalate 4 | 16 | Oxidized polypropylene | 10 | 18000 | 112 | 0.20 | <10 | 20 | 247 | 256 | 85 |
| Example 17 | Ethylene terephthalate 96 Ethylene isophthalate 4 | 16 | Oxidized polypropylene | 30 | 22000 | 124 | 0.20 | <10 | 20 | 247 | 256 | 85 |
| Example 18 | Ethylene terephthalate 96 Ethylene isophthalate 4 | 16 | Oxidized polypropylene | 40 | 34000 | 132 | 0.20 | <10 | 20 | 247 | 256 | 85 |
| Example 19 | Ethylene terephthalate 94 Ethylene isophthalate 6 | 16 | Acid-modified polyethylene | 30 | 23000 | 123 | 0.20 | <10 | 20 | 244 | 256 | 75 |
| Example 20 | Ethylene terephthalate 90 Ethylene isophthalate 10 | 16 | Acid-modified polyethylene | 30 | 23000 | 123 | 0.20 | <10 | 20 | 234 | 248 | 85 |
| Example 21 | Ethylene terephthalate 96 Cyclohexane dimethylene terephthalate 4 | 16 | Acid-modified polyethylene | 30 | 23000 | 123 | 0.20 | <10 | 20 | 250 | 260 | 85 |

TABLE 2A

| | Outermost layer | | | | | | | | Intermediate layer | | |
|---|---|---|---|---|---|---|---|---|---|---|---|
| Example 22 | Resin composition [mol %] | TiO₂ amount (wt %) | Lubricant component | Acid value of lubricant component [mg KOH/g] | Weight average molecular weight of lubricant component | Melting point of lubricant component [° C.] | Added amount of lubricant component [wt %] | Thickness [μm] | Resin composition [mol %] | TiO₂ amount (wt %) | Thickness [μm] |
| Example 23 | Ethylene terephthalate 96 Ethylene isophthalate 4 | 0 | Acid-modified polyethylene | 10 | 8400 | 125 | 0.8 | 2 | Ethyl terephyhalate 96 Ethylene isophthalate 4 | 20 | 16 |

TABLE 2A-continued

| | Outermost layer | | | | | | | | Intermediate layer | | |
|---|---|---|---|---|---|---|---|---|---|---|---|
| Example 22 | Resin composition [mol %] | TiO₂ amount (wt %) | Lubricant component | Acid value of lubricant component [mg KOH/g] | Weight average molecular weight of lubricant component | Melting point of lubricant component [° C.] | Added amount of lubricant component [wt %] | Thickness [μm] | Resin composition [mol %] | TiO₂ amount [wt %] | Thickness [μm] |
| Example 24 | Ethylene terephthalate 96 Ethylene isophthalate 4 | 0 | Acid-modified polyethylene | 30 | 23000 | 123 | 0.4 | 2 | Ethyl terephyhalate 96 Ethylene isophthalate 4 | 20 | 16 |
| Example 25 | Ethylene terephthalate 96 Ethylene isophthalate 4 | 0 | Acid-modified polyethylene | 30 | 23000 | 123 | 0.6 | 2 | Ethyl terephyhalate 96 Ethylene isophthalate 4 | 20 | 16 |
| Example 26 | Ethylene terephthalate 96 Ethylene isophthalate 4 | 0 | Acid-modified polyethylene | 30 | 23000 | 123 | 0.8 | 2 | Ethyl terephyhalate 96 Ethylene isophthalate 4 | 20 | 16 |
| Example 27 | Ethylene terephthalate 96 Ethylene isophthalate 4 | 0 | Acid-modified polyethylene | 30 | 23000 | 123 | 0.5 | 2 | Ethyl terephyhalate 96 Ethylene isophthalate 4 | 20 | 16 |
| Example 28 | Ethylene terephthalate 96 Ethylene isophthalate 4 | 0 | Acid-modified polypropylene | 18 | 52000 | 123 | 0.6 | 2 | Ethyl terephyhalate 96 Ethylene isophthalate 4 | 20 | 16 |
| Example 29 | Ethylene terephthalate 96 Ethylene isophthalate 4 | 0 | Acid-modified polypropylene | 50 | 30000 | 135 | 0.6 | 2 | Ethyl terephyhalate 96 Ethylene isophthalate 4 | 20 | 18 |
| Example 30 | Ethylene terephthalate 96 Ethylene isophthalate 4 | 0 | Oxidized polyethylene | 20 | 30000 | 110 | 0.8 | 2 | Ethyl terephyhalate 96 Ethylene isophthalate 4 | 20 | 16 |
| Example 31 | Ethylene terephthalate 96 Ethylene isophthalate 4 | 0 | Oxidized polyethylene | 35 | 8400 | 122 | 0.8 | 2 | Ethyl terephyhalate 96 Ethylene isophthalate 4 | 20 | 16 |

TABLE 2B

| | Lowermost layer | | | | | | | | | Entire outer face resin layer | | | Laminate Condtions | |
|---|---|---|---|---|---|---|---|---|---|---|---|---|---|---|
| | Resin composition [mol %] | TiO₂ amount (wt %) | Lubricant component | Acid value of lubricant component [mg KOH/g] | Weight average molecular weight of lubricant component | Melting point of lubricant component [° C.] | Added amount of lubricant component [wt %] | Thickness [μm] | TiO₂ amount [wt %] | Thickness [μm] | Added amount of lubricant component [wt %] | Dispersion diameter of lubricant component [nm] | Resin melting point [° C.] | Metal sheet temperature [° C.] | Laminate roll temperature [° C.] |
| Example 22 | Ethylene terephthalate 96 Ethylene isophthalate 4 | 0 | Acid-modified polyethylene | 10 | 8400 | 125 | 0.8 | 2 | 8 | 20 | 0.16 | <10 | 247 | 254 | 85 |
| Example 23 | Ethylene terephthalate 96 Ethylene isophthalate 4 | 0 | Acid-modified polyethylene | 30 | 23000 | 123 | 0.4 | 2 | 16 | 20 | 0.08 | <10 | 247 | 254 | 85 |

TABLE 2B-continued

| | Lowermost layer | | | | | | | | Entire outer face resin layer | | | | Laminate Conditions | | |
|---|---|---|---|---|---|---|---|---|---|---|---|---|---|---|---|
| | Resin composition [mol %] | TiO₂ amount (wt %) | Lubricant component | Acid value of lubricant component [mg KOH/g] | Weight average molecular weight of lubricant component | Melting point of lubricant component [°C] | Added of lubricant component [wt %] | Thickness [μm] | TiO₂ amount [wt %] | Thickness [μm] | Added amount of lubricant component [wt %] | Dispersion diameter of lubricant component [nm] | Resin melting point [°C] | Metal sheet temperature [°C] | Laminate roll temperature [°C] |
| Example 24 | Ethylene terephthalate 96 Ethylene isophthalate 4 | 0 | Acid-modified polyethylene | 30 | 23000 | 123 | 0.6 | 2 | 16 | 20 | 0.12 | <10 | 247 | 254 | 85 |
| Example 25 | Ethylene terephthalate 96 Ethylene isophthalate 4 | 0 | Acid-modified polyethylene | 30 | 23000 | 123 | 0.8 | 2 | 16 | 20 | 0.16 | <10 | 247 | 254 | 85 |
| Example 26 | Ethylene terephthalate 96 Ethylene isophthalate 4 | 0 | Acid-modified polyethylene | 30 | 23000 | 123 | 0.5 | 2 | 14 | 20 | 0.18 | <10 | 247 | 254 | 85 |
| Example 27 | Ethylene terephthalate 96 Ethylene isophthalate 4 | 0 | Acid-modified polypropylene | 18 | 52000 | 123 | 0.6 | 2 | 16 | 20 | 0.12 | <10 | 247 | 254 | 85 |
| Example 28 | Ethylene terephthalate 96 Ethylene isophthalate 4 | 0 | Acid-modified polypropylene | 50 | 30000 | 135 | 0.6 | 2 | 16 | 20 | 0.12 | <10 | 247 | 254 | 85 |
| Example 29 | Ethylene terephthalate 96 Ethylene isophthalate 4 | 0 | Oxidized polyethylene | 20 | 30000 | 110 | 0.8 | 2 | 16 | 20 | 0.16 | 13.9 | 247 | 254 | 85 |
| Example 30 | Ethylene terephthalate 96 Ethylene isophthalate 4 | 0 | Oxidized polyethylene | 35 | 8400 | 122 | 0.8 | 2 | 16 | 20 | 0.16 | <10 | 247 | 254 | 85 |
| Example 31 | Ethylene terephthalate 96 Ethylene isophthalate 4 | 0 | Oxidized polyethylene | 30 | 23000 | 124 | 0.6 | 2 | 16 | 20 | 0.12 | <10 | 247 | 254 | 85 |

TABLE 3

| | Resin composition [mol %] | TiO₂ amount [wt %] | Lubricant component | Acid value of lubricant component [mg KOH/g] | Weight average molecular weight of lubricant component | Melting point of lubricant component [°C.] | Added amount of lubricant component [wt %] | Dispersion diameter of lubricant component [nm] | Thickness [µm] | Resin melting point [°C.] | Laminate conditions Metal sheet temperature [°C.] | Laminate roll temperature [°C.] |
|---|---|---|---|---|---|---|---|---|---|---|---|---|
| Comparative Example 1 | Ethylene terephthalate 96 Ethylene isophthalate 4 | 0 | Polyethylene wax | 0 | 37000 | 125 | 0.10 | 17.1 | 20 | 247 | 256 | 85 |
| Comparative Example 2 | Ethylene terephthalate 96 Ethylene isophthalate 4 | 0 | Polyethylene wax | 0 | 37000 | 125 | 0.20 | 17.3 | 20 | 247 | 256 | 85 |
| Comparative Example 3 | Ethylene terephthalate 96 Ethylene isophthalate 4 | 16 | Polyethylene wax | 0 | 37000 | 125 | 0.10 | 17.3 | 20 | 247 | 256 | 85 |
| Comparative Example 4 | Ethylene terephthalate 96 Ethylene isophthalate 4 | 16 | Polyethylene wax | 0 | 37000 | 125 | 0.20 | 17.4 | 20 | 247 | 256 | 85 |
| Comparative Example 5 | Ethylene terephthalate 96 Ethylene isophthalate 4 | 0 | Polypropylene wax | 0 | 42000 | 150 | 0.05 | 17.8 | 20 | 247 | 256 | 85 |
| Comparative Example 6 | Ethylene terephthalate 96 Ethylene isophthalate 4 | 0 | Polypropylene wax | 0 | 42000 | 150 | 0.05 | 17.9 | 20 | 244 | 256 | 75 |
| Comparative Example 7 | Ethylene terephthalate 96 Ethylene isophthalate 4 | 16 | Acid-modified polyethylene | 30 | 23000 | 123 | 1.1 | 13.2 | 20 | 247 | 256 | 85 |
| Comparative Example 8 | Ethylene terephthalate 96 Ethylene isophthalate 4 | 16 | Stearic acid | 200 | 280 | 70 | 0.20 | 11.2 | 20 | 247 | 256 | 85 |

TABLE 4A

| | Outermost layer | | | | | | | | Intermediate layer | | |
|---|---|---|---|---|---|---|---|---|---|---|---|
| | Resin composition [mol %] | TiO₂ amount [wt%] | Lubricant component | Acid value of lubricant component [mg KOH/g] | Weight average molecular weight of lubricant component | Melting point of lubricant component [°C.] | Added amount of lubricant component [wt %] | Thickness [µm] | Resin composition [mol %] | TiO₂ amount [wt %] | Thickness [µm] |
| Comparative Example 9 | Ethylene terephthalate 96 Ethylene isophthalate 4 | 0 | — | — | — | — | 0 | 2 | Ethylene terephthalate 96 Ethylene isophthalate 4 | 20 | 16 |
| Comparative Example 10 | Ethylene terephthalate 96 Ethylene isophthalate 4 | 0 | Polyethylene wax | 0 | 37000 | 125 | 0.1 | 2 | Ethylene terephthalate 96 Ethylene isophthalate 4 | 20 | 16 |
| Comparative Example 11 | Ethylene terephthalate 96 Ethylene isophthalate 4 | 0 | Polyethylene wax | 0 | 37000 | 125 | 0.2 | 2 | Ethylene terephthalate 96 Ethylene isophthalate 4 | 20 | 16 |
| Comparative Example 12 | Ethylene terephthalate 96 Ethylene isophthalate 4 | 0 | Polypropylene wax | 0 | 3700 | 125 | 0.3 | 2 | Ethylene terephthalate 96 Ethylene isophthalate 4 | 20 | 16 |

TABLE 4A-continued

| | Outermost layer | | | | | | | | Intermediate layer | | |
|---|---|---|---|---|---|---|---|---|---|---|---|
| | Resin composition [mol %] | TiO: amount [wt%] | Lubricant component | Acid value of lubricant component [mg KOH/g] | Weight average molecular weight of lubricant component | Melting point of lubricant component [° C.] | Added amount of lubricant component [wt %] | Thickness [μm] | Resin composition [mol %] | TiO₂ amount [wt %] | Thickness [μm] |
| Comparative Example 13 | Ethylene terephthalate 96 Ethylene isophthalate 4 | 0 | Polypropylene wax | 0 | 37000 | 125 | 0.4 | 2 | Ethylene terephthalate 96 Ethylene isophthalate 4 | 20 | 16 |
| Comparative Example 14 | Ethylene terephthalate 96 Ethylene isophthalate 4 | 0 | Polypropylene wax | 0 | 37000 | 125 | 0.45 | 2 | Ethylene terephthalate 96 Ethylene isophthalate 4 | 20 | 18 |
| Comparative Example 15 | Ethylene terephthalate 96 Ethylene isophthalate 4 | 0 | Polypropylene wax | 0 | 37000 | 125 | 1.0 | 2 | Ethylene terephthalate 96 Ethylene isophthalate 4 | 20 | 16 |
| Comparative Example 16 | Ethylene terephthalate 96 Ethylene isophthalate 4 | 0 | Polypropylene wax | 0 | 42000 | 150 | 0.5 | 2 | Ethylene terephthalate 96 Ethylene isophthalate 4 | 20 | 16 |

TABLE 4B

| | Lowermost layer | | | | | | | |
|---|---|---|---|---|---|---|---|---|
| | Resin composition (mol %) | TiO₂ amount [wt %] | Lubricant component | Acid value of lubricant component [mg/ KOH/g] | Weight average molecular weight of lubricant component | Melting point of lubricant component [° C.] | Added amount of lubricant component [wt %] | Thickness [μm] |
| Comparative Example 9 | Ethylene terephthalate 96 Ethylene isophthalate 4 | 0 | — | — | — | — | 0 | 2 |
| Comparative Example 10 | Ethylene terephthalate 96 Ethylene isophthalate 4 | 0 | Polyethylene wax | 0 | 37000 | 125 | 0.1 | 2 |
| Comparative Example 11 | Ethylene terephthalate 96 Ethylene isophthalate 4 | 0 | Polyethylene wax | 0 | 37000 | 125 | 0.2 | 2 |
| Comparative Example 12 | Ethylene terephthalate 96 Ethylene isophthalate 4 | 0 | Polyethylene wax | 0 | 37000 | 125 | 0.3 | 2 |
| Comparative Example 13 | Ethylene terephthalate 96 Ethylene isophthalate 4 | 0 | Polyethylene wax | 0 | 37000 | 125 | 0.4 | 2 |
| Comparative Example 14 | Ethylene terephthalate 96 Ethylene | 0 | Polyethylene wax | 0 | 37000 | 125 | 0.45 | 2 |

TABLE 4B-continued

| | | | | | | | | |
|---|---|---|---|---|---|---|---|---|
| | isophthalate 4 | | | | | | | |
| Comparative Example 15 | Ethylene terephthalate 96 Ethylene isophthalate 4 | 0 | Polyethylene wax | 0 | 37000 | 125 | 1.0 | 2 |
| Comparative Example 16 | Ethylene terephthalate 96 Ethylene isophthalate 4 | 0 | Polypropylene wax | 0 | 42000 | 150 | 0.5 | 2 |

| | Entire outer face resin layer | | | | Laminate conditions | |
|---|---|---|---|---|---|---|
| | $TiO_2$ amount [wt %] | Thickness [μm] | Added amount of lubricant component [wt %] | Dispersion diameter of lubricant component [nm] | Resin melting point [° C.] | Metal sheet temperature [° C.] | Laminate roll temperature [° C.] |
| Comparative Example 9 | 16 | 20 | 0 | — | 247 | 254 | 85 |
| Comparative Example 10 | 16 | 20 | 0.02 | 17.2 | 247 | 254 | 85 |
| Comparative Example 11 | 16 | 20 | 0.04 | 17.4 | 247 | 254 | 85 |
| Comparative Example 12 | 16 | 20 | 0.06 | 17.7 | 247 | 254 | 85 |
| Comparative Example 13 | 16 | 20 | 0.08 | 18.1 | 247 | 254 | 85 |
| Comparative Example 14 | 16 | 20 | 0.09 | 18.3 | 247 | 254 | 85 |
| Comparative Example 15 | 16 | 20 | 0.20 | 18.6 | 247 | 254 | 85 |
| Comparative Example 16 | 16 | 20 | 0.10 | 17.5 | 247 | 254 | 85 |

TABLE 5

| | Ink adhesiveness | Formability |
|---|---|---|
| Example 1 | B | A |
| Example 2 | B | A |
| Example 3 | A | A |
| Example 4 | A | A |
| Example 5 | A | A |
| Example 6 | A | A |
| Example 7 | B | A |
| Example 8 | A | A |
| Example 9 | A | A |
| Example 10 | A | A |
| Example 11 | A | A |
| Example 12 | A | B |
| Example 13 | A | A |
| Example 14 | B | A |
| Example 15 | A | A |
| Example 16 | A | A |
| Example 17 | A | A |
| Example 18 | A | A |
| Example 19 | A | A |
| Example 20 | A | A |
| Example 21 | A | A |
| Example 22 | A | A |
| Example 23 | A | A |
| Example 24 | A | A |
| Example 25 | A | A |
| Example 26 | A | A |
| Example 27 | A | A |
| Example 28 | A | B |
| Example 29 | B | A |
| Example 30 | A | A |

TABLE 5-continued

| | Ink adhesiveness | Formability |
| --- | --- | --- |
| Example 31 | A | A |
| Comparative Example 1 | D | A |
| Comparative Example 2 | D | A |
| Comparative Example 3 | D | A |
| Comparative Example 4 | D | A |
| Comparative Example 5 | D | A |
| Comparative Example 6 | C | A |
| Comparative Example 7 | C | B |
| Comparative Example 8 | C | B |
| Comparative Example 9 | A | D |
| Comparative Example 10 | C | A |
| Comparative Example 11 | C | A |
| Comparative Example 12 | D | A |
| Comparative Example 13 | D | A |
| Comparative Example 14 | D | A |
| Comparative Example 15 | D | A |
| Comparative Example 16 | D | A |

INDUSTRIAL APPLICABILITY

Aspects of the present invention can provide a resin-coated metal sheet for a container that can inhibit breaking or scraping of the resin coating layer along with processing and separation of the printing ink after printing.

REFERENCE SIGNS LIST

1 Resin-coated metal sheet for container
2 Metal sheet
3, 4 Resin coating layer
3a Outermost layer
3b Intermediate layer
3c Lowermost layer

The invention claimed is:

1. A resin-coated metal sheet for a container, comprising:
a metal sheet;
a first resin coating layer provided on an inner face of the metal sheet after forming; and
a second resin coating layer provided on an outer face of the metal sheet after forming, the second resin coating layer containing:
a polyester resin having a melting point of 230° C. to 254° C. as a main component; and
a lubricant component, a melting point of the lubricant component being 80° C. to 230° C., an average particle diameter of the lubricant component present on a surface of the second resin coating layer being 17.0 nm or less,
wherein the lubricant component is an acid-modified polyolefin or an oxidized polyolefin and has a weight average molecular weight of 2,500 or more and less than 80,000 and an acid value of 1.0 mg KOH/g to 100 mg KOH/g.

2. The resin-coated metal sheet according to claim 1, wherein the second resin coating layer contains 30% by mass or less of titanium oxide.

3. The resin-coated metal sheet for the container according to claim 2, wherein
the second resin coating layer has at least a three-layer structure including an outermost layer, an intermediate layer, and a lowermost layer,
thicknesses of the outermost layer and the lowermost layer are 1.0 μm to 5.0 μm,
a thickness of the intermediate layer is 6.0 μm to 30 μm,
each of the outermost layer and the lowermost layer contains 0.0% by mass to 2.0% by mass of titanium oxide, and
the intermediate layer contains 10% by mass to 30% by mass of titanium oxide.

4. A resin-coated metal sheet for a container, comprising:
a metal sheet;
a first resin coating layer provided on an inner face of the metal sheet after forming; and
a second resin coating layer provided on an outer face of the metal sheet after forming, the second resin coating layer containing:
a polyester resin having a melting point of 230° C. to 254° C. as a main component; and
a lubricant component, a melting point of the lubricant component being 80° C. to 230° C., an average particle diameter of the lubricant component present on a surface of the second resin coating layer being 17.0 nm or less,
wherein the second resin coating layer contains 0.010% by mass to 1.0% by mass of the lubricant component, and
wherein the lubricant component is an acid-modified polyolefin or an oxidized polyolefin and has a weight average molecular weight of 2,500 or more and less than 80,000 and an acid value of 1.0 mg KOH/g to 100 mg KOH/g.

5. The resin-coated metal sheet according to claim 4, wherein the second resin coating layer contains 30% by mass or less of titanium oxide.

6. The resin-coated metal sheet for the container according to claim 5, wherein
the second resin coating layer has at least a three-layer structure including an outermost layer, an intermediate layer, and a lowermost layer,
thicknesses of the outermost layer and the lowermost layer are 1.0 μm to 5.0 μm,
a thickness of the intermediate layer is 6.0 μm to 30 μm,
each of the outermost layer and the lowermost layer contains 0.0% by mass to 2.0% by mass of titanium oxide, and
the intermediate layer contains 10% by mass to 30% by mass of titanium oxide.

* * * * *